United States Patent

[11] 3,604,654

| [72] | Inventor | Robert W. Stoffel<br>Ferndale, Mich. |
|---|---|---|
| [21] | Appl. No. | 760,918 |
| [22] | Filed | Sept. 19, 1968 |
| [45] | Patented | Sept. 14, 1971 |
| [73] | Assignee | Jim Robbins Seat Belt Co.<br>Troy, Mich. |

[54] AUTOMATIC SEATBELT RETRACTOR WITH SLIP CLUTCH
10 Claims, 8 Drawing Figs.

[52] U.S. Cl. .................................................. 242/107.4
[51] Int. Cl. .................................................. B65h 75/48
[50] Field of Search ......................................... 242/107,
107 SB, 107.4, 107.5, 107.6; 297/388

[56] References Cited
UNITED STATES PATENTS

| 3,348,789 | 10/1967 | Hirsch ........................ | 242/107.4 |
| 3,412,952 | 11/1968 | Wohlert et al. ............... | 242/107.4 |
| 3,446,454 | 5/1969 | Kovacs et al. ................ | 242/107.4 |
| 3,450,368 | 6/1969 | Glauser et al. ............... | 242/107.4 |

Primary Examiner—Stanley N. Gilreath
Assistant Examiner—Werner H. Schroeder
Attorneys—Marvin Bressler and Jonathan Plaut ABSTRACT: An automatic seatbelt retracting device is disclosed having a slip clutch connecting the belt windup reel and a locking mechanism in an arrangement that allows a selected quantity of the belt to be extended from its fully retracted position, and then, in response to a partial retraction of the belt sets a locking pawl to restrict further rotation of the reel in its unwinding direction. A roller, mounted adjacent the reel, senses the belt as it is unwound from the reel from its fully retracted position and prevents the clutch from moving the pawl into locking engagement with the reel until a predetermined quantity of the belt has been extended from the reel.

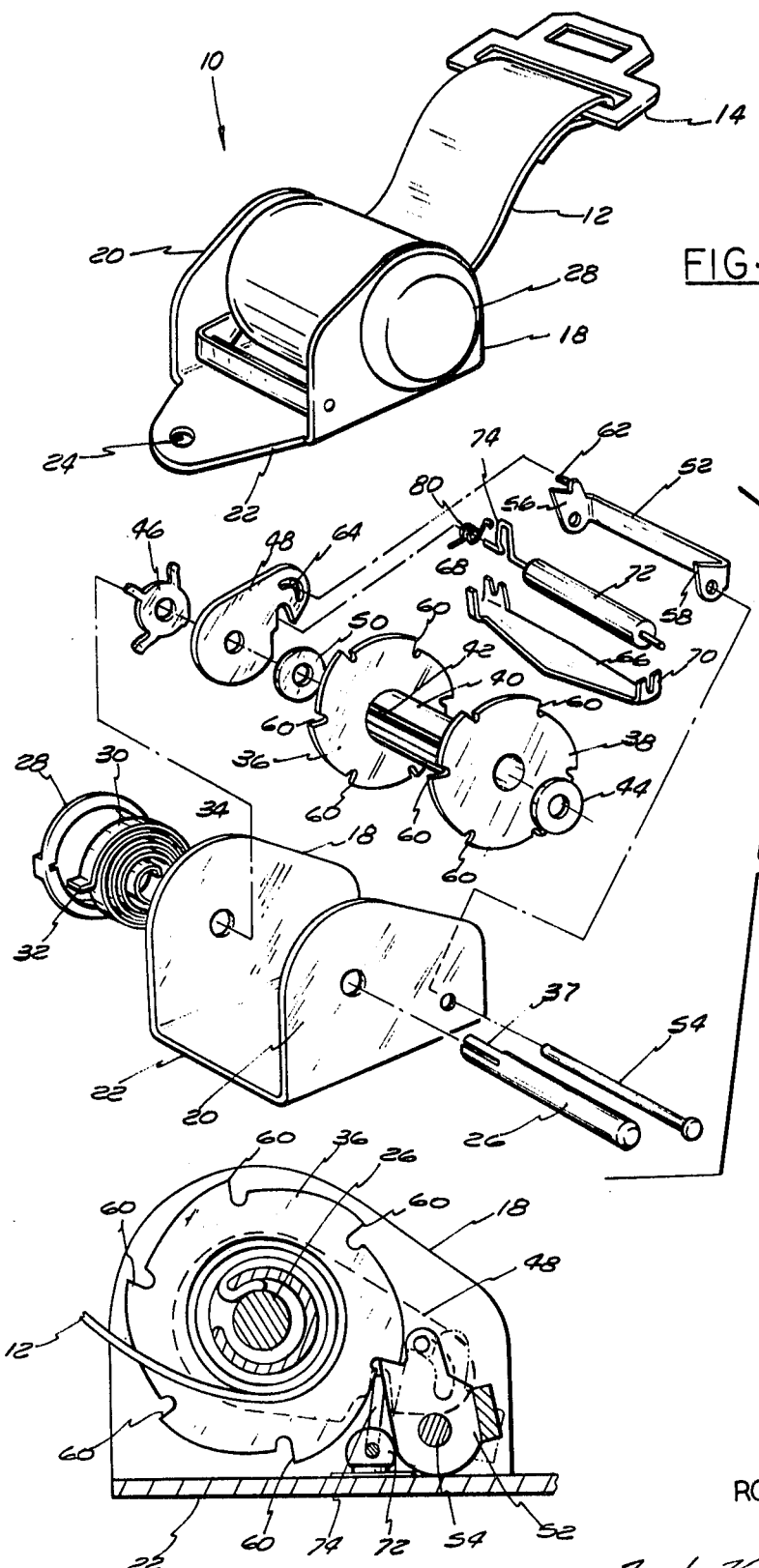

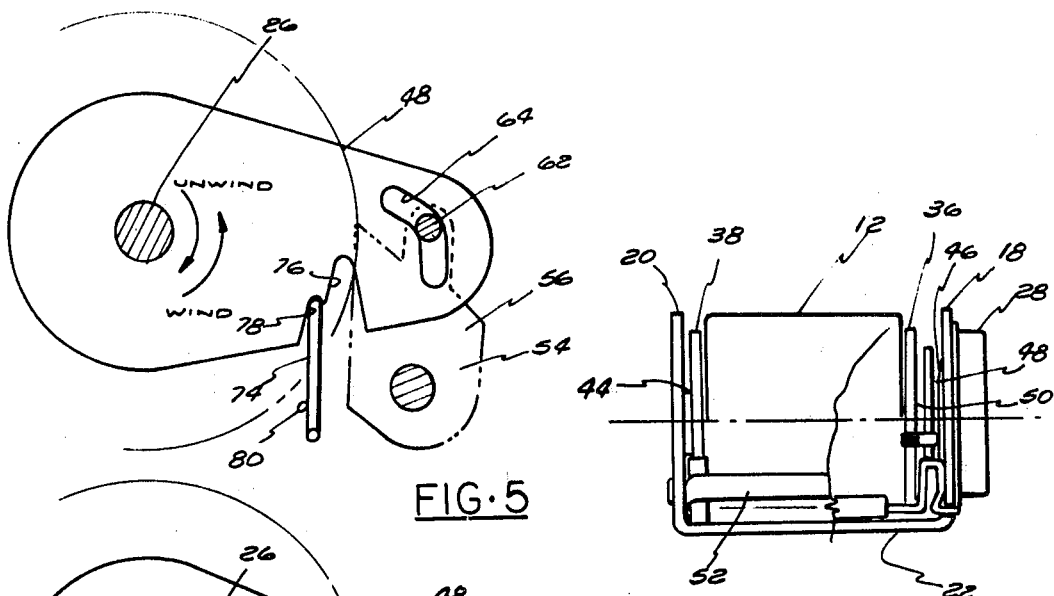
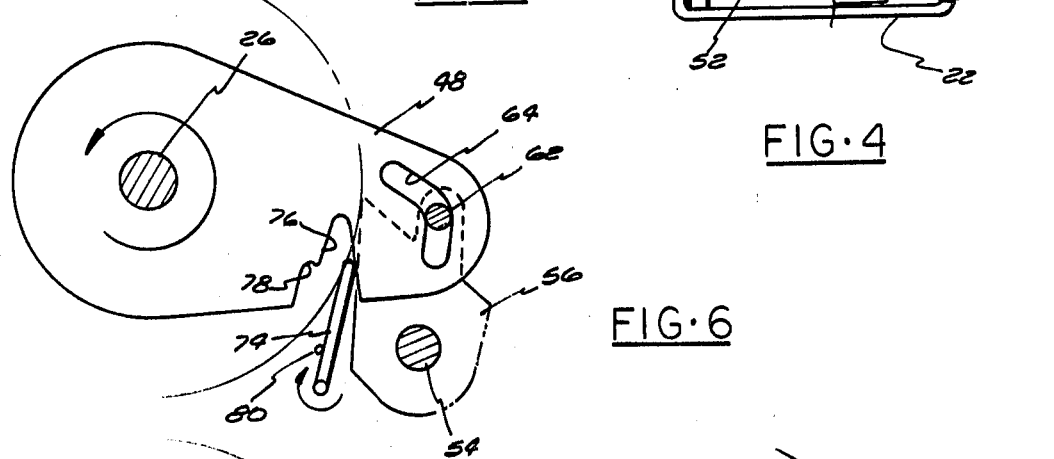
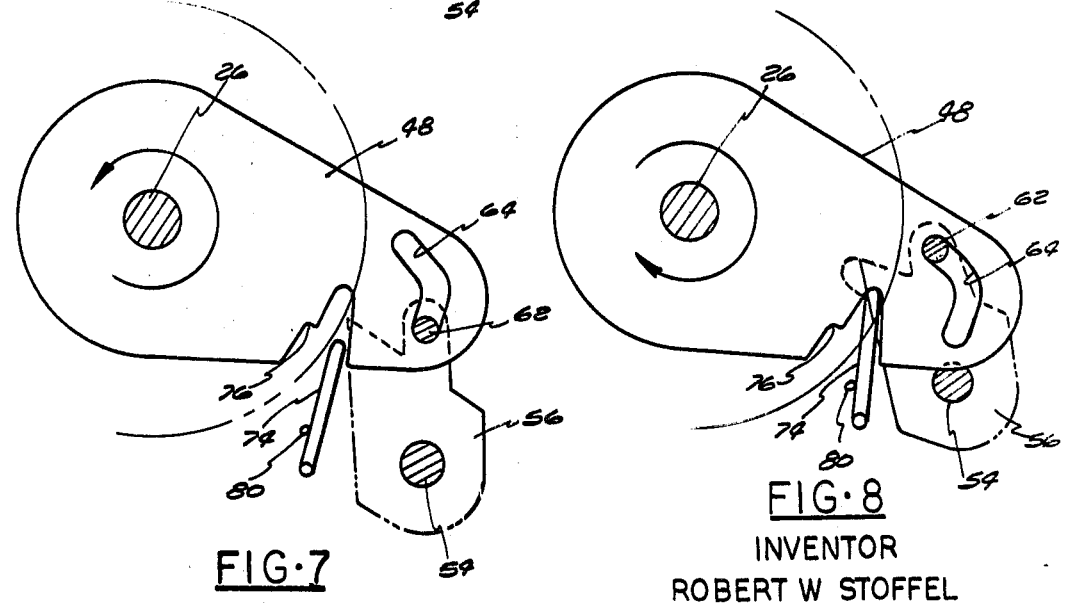

3,604,654

AUTOMATIC SEATBELT RETRACTOR WITH SLIP CLUTCH

BACKGROUND OF THE INVENTION

This invention relates to vehicle safety seat systems and more particularly to a seatbelt retracting device having a slip clutch for automatically controlling the motion of a locking device as a selected portion of the belt is extended from the reel.

Seatbelt retracting devices are known in the prior art in which a safety seatbelt, connected to a spring-biased reel, is automatically wound into a wound-up retracted position when it is not employed as a restraining element. Such devices have also been provided with a locking mechanism that is operable, after a predetermined quantity of belt has been initially extended from the reel, to lock the reel against rotation when the user has extended a selected quantity of the belt from the reel. The purpose of such an arrangement is to provide means for automatically adjusting the length of the belt extended from the reel to accommodate the desires of the user, and to prevent the locking mechanism from prelocking as the belt is initially extended from the reel. One such arrangement is shown in U.S. Pat. No. 3,174,704, to E. H. Replogle.

SUMMARY

The broad purpose of the present invention is to provide an improved automatic seatbelt retracting device having a clutch formed of a reduced number of components to control the locking and unlocking of the reel in response to changes in its direction of rotation as the belt is either being extended or retracted. Another object of the invention is to provide a simplified means for sensing the quantity of belt that is on the reel to prevent the locking means from being actuated until a predetermined quantity of belt has been unwound from the reel.

The preferred embodiment of the present invention, which will be subsequently described in greater detail, comprises a support adapted to be fixedly connected to a vehicle and provided with a pair of spaced parallel walls. A spring-biased reel is journaled on the walls and connected to one end of a seatbelt such that as the reel is rotated in one direction, the belt is retracted into a roll. As the belt is unwound from the reel, it rotates in the opposite direction. A pair of ratchets are fixedly carried on the reel between the walls with one being on each side of the position of the belt roll, a pawl is mounted on the support for motion between a first position in which it is engageable with the ratchets to prevent the reel from being rotated in the direction in which the belt is unwound, and a second position in which it is separated from the ratchet.

One of the ratchets functions as a driving plate clutch. A thin, driven clutch plate is disposed between the driving clutch and its adjacent wall, and is mounted on the reel such that it can be rotated relative to the reel. A spring between the support and the driven clutch biases it toward the driving clutch so that as the reel is rotated the driven clutch can be frictionally rotated through a limited angle of rotation between a pair of rotated positions. The pawl is connected to the driven clutch such that as it is rotated toward one of its rotated positions the pawl is moved into locking engagement with the ratchets. Similarly as the driven clutch is rotated toward its other position by the driving clutch, the pawl is moved toward its unlocked position.

In order to prevent the pawl from locking the reel before a significant portion of the belt has been extended from the reel, a sensing roller is mounted on the support such that as the belt roll assumes a given diameter it contacts and rotates the roller between a pair of positions in a direction that depends on whether the belt is being extended or retracted. A finger carried on the roller is engaged with the driven clutch, when the roller is in one of its positions, and as a strut preventing the driven clutch from being rotated to move the pawl into locking engagement with the ratchets. In this position, the driven clutch can be said to be in a holdout position, that is, it holds the pawl out of engagement with the ratchets. In the other position of the roller, the finger allows the driven clutch to be rotated by the reel to either lock or unlock the pawl depending on the direction of the reel's rotation.

The sensing roller provides means for disabling the driven clutch while a given portion of the belt is on the reel. As the belt is initially unwound from the reel, the diameter of the roll is reduced until it no longer contacts the sensing roller with a sufficient pressure maintain it as a strut against the influence of a spring that biases it toward its alternate position. When the belt is partially retracted, the reel rotates the driven clutch through a small angle that is sufficient to allow the finger to be snapped to its alternate position. The driven clutch is then in condition to move the pawl into engagement with the ratchets as the reel is rotated by a subsequent extension of the belt.

The preferred automatic locking retractor is composed of a relatively few components, lends itself to a compact assembly that occupies substantially the same space as a conventional nonlocking reel, provides reliable and trouble-free operation and permits the belt to be extended to any adjusted length without the problem of the locking mechanism prelocking. Still further objects and advantages of the present invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views and in which:

FIG. 1 is a perspective view of an automatic locking retractor illustrating the preferred embodiment of the invention showing the belt wound on the reel;

FIG. 2 is an exploded view of the preferred retractor

FIG. 3 is an elevational view of the preferred retractor showing the pawl in its locking position with respect to the ratchets;

FIG. 4 is an end elevational view of the preferred retractor with parts in section for purposes of description, and FIGS. 5 to 8 are enlarged views showing the driven clutch, the finger carried by the roller, and the pawl in various positions.

DESCRIPTION OF THE PREFERRED EMBODIMENT

Now referring to the drawings, a preferred automatic locking retractor 10 is illustrated in FIG. 1. One end of a conventional safety seatbelt 12 is connected to the retractor. The other end of the belt 12 carries a coupling element 14 that is intended to be coupled to a buckle (not shown) by the user after a selected length of the belt 12 has been extended from the retractor 10.

Now referring to FIGS. 1, 2 and 4, the preferred retracting device 10 includes a metal support 16 with a channel-shaped cross section defined by a pair of spaced, parallel walls 18 and 20 connected by a base 22. The base 22 has an aperture 24 providing means for a suitable fastening member (not shown) to attach the support 16 to a vehicle.

A reel 26 is journaled in a pair of openings in the walls 18 and 20 such that it spans the two walls. One end of the reel 26 extends beyond the wall 18 into a housing 28 fixedly mounted on the outer side of the wall 18. A spiral spring 30 disposed in the housing has one end 32 connected to the housing and its other end 34 disposed in a slot 37 on the end of the reel so that the reel is biased in one of its directions of rotation.

A pair of platelike, circular ratchets 36 and 38 are fixedly attached to the ends of a cylinder 40 having a slot 42 that extends between both ratchets. The two ratchets 36 and 38 are concentrically mounted on the reel and fixed against rotation with respect to the reel.

The end of the belt 12 extends into the slot 42, around the reel 26, then out of the slot and stitched to itself to form a permanent loop. As the belt 12 is unwound from the roll by the user, the reel is rotated in its opposite direction against the bias of the spring 30. When the belt is released by the user, the spring 30 rotates the reel and automatically winds the belt into a roll on the cylinder 40.

A spacer 44 is preferably disposed between the ratchet 38, and the wall 20. A spring 46, a driven clutch plate 48, and a friction member 50 are disposed between the ratchet 36 and the wall 18. The clutch plate 48 is mounted on the reel 26 such that it can be rotated relative to the ratchet 36 which acts as a driving clutch member. The clutch plate 48 is preferably formed of a lightweight plastic such as nylon. The spring 46 biases the clutch plate 48 toward the ratchet 36 so that the friction member 50, preferably formed of a suitable lightweight material such as Urethane, provides a frictional connection between the ratchet 36 and the clutch plate 48 so that it can be rotated as the reel 26 is rotated in either of its two directions of rotation.

A pawl 52 is rotatably mounted by a pin 54 that is journaled on the sides 18 and 20 of the support such that a pair of pawl teeth 56 and 58 can be pivoted toward and away from engagement with the ratchets 36 and 38 between locked and unlocked positions. As best illustrated in FIG. 3, each of the ratchets has a series of annularly spaced teeth 60 formed such that when engaged with the pawl teeth, the reel is locked against rotation in its unwind direction although it can still be rotated in its opposite wind direction. The locked position of the pawl is illustrated in solid lines in FIG. 3 and its unlocked position is illustrated in phantom lines.

The position of the pawl depends on the position of a pin 62 carried by the pawl and disposed in a slot 64 in the clutch plate 48. FIGS. 5 to 8 show various positions of the clutch plate 48 and the pawl tooth 56. In FIG. 5, the clutch plate 48 is illustrated in a "holeout" position in which the pawl teeth 56 and 58 are separated from the ratchets. In FIG. 6 the clutch plate 48 is illustrated in a "set" position in which it has been rotated through a small angle in the wind direction with respect to its holdout position. FIG. 7 shows the clutch plate 48 rotated in the wind direction from its set position by a retraction motion in which the sides of the slot have moved the pawl to its fully unlocked position. FIG. 8 illustrates the clutch plate 48 rotated in the unwind direction with respect to its holdout position by a second extension of the belt in a motion in which the sides of the slot 64 have moved the pin 62 and the pawl into its fully locked position in which the teeth are in abutment with the ratchets. Thus it can be seen that the clutch plate 48 moves the pawl into and out of locking engagement with the ratchets as it is moved by the reel.

As best shown in FIGS. 2 and 3, a resilient support 66, mounted on the base 22, has a pair of resilient ends 68 and 70, which provide means for rotatably mounting a belt-sensing roller 72 such that the roller is resiliently movable toward and away from the base 22. The roller 72 is disposed such that when the belt 12 has been wound on the reel into a roll of a predetermined diameter it engages the surface of the roller 72. As the belt 12 comes into contact with the roller 72, its motion causes the roller to rotate in a direction that depends on the direction of motion of the belt. A finger 74 carried by the roller moves with the roller between a pair of positions shown in FIGS. 5 and 6. The finger 74 is disposed in a cutout portion 76 of the clutch plate 48. In its forward position, illustrated in FIG. 5, the finger engages a shoulder 78 to act as a strut and prevent the clutch plate from being rotated in the unwind direction. In this position, the clutch plate 48 cannot move the pawl toward the ratchets. In its rearward position, illustrated in FIGS. 6, 7 and 8, the finger 74 is separated from the shoulder 78 so that the clutch plate can be rotated with the reel. A spring 80, having one end anchored to the wall 20 of the support and its other end connected to the finger 74, biases the finger toward its rearward position so that it does not restrict the motion of the clutch plate 48.

In operation and assuming the belt 12 is in its fully retracted position and wound on the cylinder 40 to form a roll engaged with the roller 72, the finger 70 is in its rearward position, and the clutch plate 48 has moved the pawl 52 into its unlocked position an initial extension of the belt 12 causes the reel 26 to rotate in its unwind direction. The motion of the belt also rotates the roller 72 so that the finger 74 pivots to its forward position in which it is adjacent the shoulder 78. Assuming the belt is extended until the size of the roll on the reel decreases so that it no longer engages the roller 72, the clutch plate 48 is rotated from the position shown in FIG. 7 to its holdout position, illustrated in FIG. 5, with the shoulder 78 in abutment with the finger 74 and retains the finger 74 in its forward position. The finger 74, in turn, prevents the clutch plate 48 from further rotation in the unwind direction thereby acting as a strut to maintain the pawl 52 in its holdout position. If the belt is then partially, slightly retracted so that the reel rotates through a small angular interval in the wind direction, the clutch plate 48 is rotated by its frictional connection with the ratchet 36 thereby allowing the spring 80 to snap the finger 74 to its rearward position, illustrated in FIG. 6. In this position the pawl is in its set position. If the belt is then allowed to continue its retraction motion, the clutch plate 48 is rotated toward the position, illustrated in FIG. 7, and moves the pawl 52 to its fully unlocked position. However if the belt is extended in a second motion, the clutch plate 48, by means of its frictional connection with the ratchet 36, rotates with the reel in the unwind direction and moves the pawl 52 into abutment with the reel so as the pawl's teeth 56 and 58 engage a pair of teeth 60 on the ratchets 36 and 38, the reel is locked against further rotation in the unwind direction.

To unlock the reel so that it can be extended to a new position, the belt is allowed to be retracted under the influence of the spring 30 until the roll increases to a diameter that is sufficient to engage the roller 72. The belt can be extended to a new position as the finger 74 is pivoted forwardly so that it again acts as a strut to prevent the clutch plate 48 from moving the pawl toward the ratchets. Thus it can be seen that the belt 12 does not have to be fully retracted in order to readjust its extended length after the reel has been locked. In addition the resilient mounting of the roller 72 allows it to be engaged with the roll until a suitable quantity such as 12 inches of the belt has been unwound from the reel thereby obviating the possibility of the pawl 52 being moved into locking engagement with the ratchets before the belt has been extended to its desired position.

Having described my invention, I claim:

1. A A seatbelt retracting device, comprising: (a) a support; (b) a reel journaled on said support for rotation in either a first, retracting direction, or in the opposite, extending direction; (c) an elongated seatbelt having one end coupled to the reel such that it is retracted with respect to the support as the reel is rotated in its first direction, and is allowed to extend as the reel is rotated in the opposite directional (d) bias means normally urging the reel toward rotation in the retracting direction; (e) locking means supported for movement between a first position in which it is operative to prevent rotation of the reel in its extending direction, and a second position in which it is inoperative to prevent rotation of the reel; (f) automatic clutch means on said reel having a first condition in which it is rotatable with the reel, and a second condition in which it is rotatable with respect to the reel, the clutch means being coupled to the locking means to move the locking means toward its first position when the clutch means is in its first condition and the reel is rotated in its extending direction, and to move the locking means toward its second position when the clutch means is in its second condition and the reel is rotated in the retracting direction; and (g) first means responsive to being rotated in the retracting direction for placing the clutch means in its first condition.

2. A seatbelt retracting device as defined in claim 1, in which said first means is inoperable to place the clutch means in its first condition unless a predetermined quantity of the belt has been extended from the reel.

3. A seatbelt retracting device as defined in claim 1, in which the belt is wound into a roll having an increasing diameter as the reel is rotated in its retracting direction, and is capable of being unwound from the roll such that the diameter of the roll decreases as the reel is rotated in its extending direction, and said first means are inoperable to place the clutch means in its first condition unless the diameter of the roll is less than a predetermined diameter.

4. A seatbelt retracting device comprising: a support; a reel journaled on said support for rotation in either a first, retracting direction, or in the opposite, extending direction; an elongated seatbelt having one end coupled to the reel such that it is retracted with respect to the support as the reel is rotated in its first direction, and is allowed to extend as the reel is rotated in the opposite direction; bias means normally urging the reel toward rotation in the retracting direction; locking means supported for movement between a first position in which it is operative to prevent rotation of the reel in its extending direction, and a second position in which it is inoperative to prevent rotation of the reel; automatic clutch means on said reel having a first condition in which it is rotatable with the reel, and a second condition in which it is rotatable with respect to the reel, the clutch means being coupled to the locking means to move the locking means toward its first position when the clutch means is in its first condition and the reel is rotated in its extending direction, and to move the locking means toward its second position when the clutch means is in its second condition and the reel is rotated in the retracting direction; said belt wound into a roll having an increasing diameter as the reel is rotated in its retracting direction and is unwound from the roll such that its diameter decreases as the reel is rotated in its extending direction; a roller mounted on the support for rotation in a first direction and a second, opposite direction, the roller being engageably with the belt roll when it has a predetermined diameter such that the roller is rotated in its first direction as the belt is extended from the roll, and rotated in its second direction as the belt is retracted toward the roll; and a finger carried on said roller connected with said clutch means in one of the positions of the roller to prevent the clutch means from rotating with the reel as the reel is rotated in extending direction; and in the other position of the roller to allow the clutch means to rotate with the reel as the reel is rotated.

5. A retracting reel assembly comprising; support means; reel means rotatably supported by said support means; an elongated flexible element connected to said reel means and adapted to be wound thereon and unwound therefrom; locking means movable between locked and unlocked positions for respectively preventing and allowing rotation of said reel means, and clutch means coaxial with said reel means and frictionally driven thereby between holdout and set positions, said clutch means being operatively connected to said locking means to said unlocked position upon movement to said holdout position and for moving said locking means to said locked position upon movement to said set position.

6. An assembly as set forth in claim 5 including means for maintaining said clutch means in said holdout position during a predetermined amount of rotation of said reel means in the unwind direction from the fully wound position.

7. An assembly as set forth in claim 5 including means for maintaining said clutch means in said holdout position during a predetermined amount of rotation of said reel means in the unwind direction and until there is a subsequent rotation of said reel means in the wind direction.

8. A retracting reel assembly comprising:
a. support means;
b. reel means rotatably supported by said support means;
c. an elongated flexible element connected to said reel means and adapted to be wound thereon and unwound therefrom;
d. a locking pawl movable between locked and unlocked positions for respectively preventing and allowing rotation of said reel means;
e. a clutch plate, provided with a slot therein, coaxial with said reel means and frictionally driven thereby between holdout and set positions, said clutch plate being operatively connected to said locking pawl by a pin extending through said locking pawl and through said slot in said clutch plate for moving said locking pawl to said unlocked position upon movement to said holdout position and for moving said locking pawl to said locked position upon movement to said set position.

9. An assembly as set forth in claim 8 wherein said clutch plate includes a shoulder and a cutout portion adjacent thereto, and including means to engage said shoulder for maintaining said clutch plate in said holdout position and movable to said cutout portion for allowing said clutch plate to move to said set position.

10. An assembly as set forth in claim 9 wherein said last-mentioned means includes a roller mounted on said support means for engagement with said elongated flexible element when the latter has been wound to a predetermined diameter on said reel means so as to be moved in a first direction as said flexible element is unwound from said reel means and to be moved in a second direction as said flexible element is wound onto said reel means, and finger means responsive to movement of said roller for selective disposition in said cutout portion and in engagement with said shoulder.

PO-1050
(5/69)

UNITED STATES PATENT OFFICE
CERTIFICATE OF CORRECTION

Patent No. 3,604,654      Dated September 14, 1971

Inventor(s) Robert W. Stoffel

It is certified that error appears in the above-identified patent and that said Letters Patent are hereby corrected as shown below:

Column 2, line 36, after "retractor" there should be added --of Figure 1.--.

Column 3, line 35, the word "holeout" should be --holdout--.

Column 4, line 21, the word "set" should be enclosed in quotation marks --"set"--.

Column 4, claim 1, line 1, delete the second "A" before the word "seatbelt".

Column 4, claim 1, line 54, the word "directional" should be --direction;--.

Column 4, claim 1, line 70, after the words "rotated in" and before the words "the retracting" there should be added --its extending direction subsequent to being rotated in--.

Column 5, claim 4, line 35, the word "engageably" should be --engageable--.

Column 6, claim 5, line 4, after the word "means" and before the words "to said" there should be added --through a pin slidably disposed in a slot for moving said locking means--.

Signed and sealed this 2nd day of May 1972.

(SEAL)
Attest:

EDWARD M. FLETCHER, JR.
Attesting Officer

ROBERT GOTTSCHALK
Commissioner of Patents